US011888749B2

(12) United States Patent
Tourrilhes et al.

(10) Patent No.: US 11,888,749 B2
(45) Date of Patent: Jan. 30, 2024

(54) REVERSE LOSS DETECTION FOR COMMUNICATION NETWORK BANDWIDTH ESTIMATION WITH TOKEN BUCKETS

(71) Applicant: HEWLETT PACKARD ENTERPRISE DEVELOPMENT LP, Houston, TX (US)

(72) Inventors: Jean Tourrilhes, Milpitas, CA (US); Puneet Sharma, Milpitas, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 77 days.

(21) Appl. No.: 17/510,232

(22) Filed: Oct. 25, 2021

(65) Prior Publication Data
US 2023/0147437 A1 May 11, 2023

(51) Int. Cl.
H04L 47/215 (2022.01)
H04L 47/2441 (2022.01)
H04L 43/10 (2022.01)
H04L 47/783 (2022.01)
H04L 43/0829 (2022.01)
H04L 47/70 (2022.01)

(52) U.S. Cl.
CPC ........ H04L 47/215 (2013.01); H04L 43/0829 (2013.01); H04L 43/10 (2013.01); H04L 47/2441 (2013.01); H04L 47/783 (2013.01); H04L 47/823 (2013.01)

(58) Field of Classification Search
CPC . H04L 47/215; H04L 47/2441; H04L 47/783; H04L 47/823; H04L 43/0829; H04L 43/10
See application file for complete search history.

(56) References Cited

U.S. PATENT DOCUMENTS

| 6,839,754 | B2 | 1/2005 | Nowak et al. |
| 7,065,482 | B2 | 6/2006 | Shorey et al. |
| 7,072,304 | B2 | 7/2006 | Ng et al. |
| 7,180,858 | B1 | 2/2007 | Roy et al. |

(Continued)

FOREIGN PATENT DOCUMENTS

| CA | 2291835 A1 | 6/2001 |
| EP | 1758313 | 2/2007 |

(Continued)

OTHER PUBLICATIONS

Aalto University, Congestion Control Using FEC for Conversational Media, 2014, pp. 1-9, Retrieved from the Internet Oct. 21, 2019 from URL: tools.ietf.org/id/draft-singh-rmcat-adaptive-fec-01.xml>.

(Continued)

Primary Examiner — Siming Liu
(74) Attorney, Agent, or Firm — Sheppard Mullin Richter & Hampton LLP

(57) ABSTRACT

Systems and methods are provided for measuring available bandwidth available in a black box network by determining a probing rate of packet transmissions between a sender and receiver. The optimal probing rate and bandwidth estimate may be determined. Additional actions may be performed, like automatically rerouting packets and/or load balancing network traffic after the probing rate is determined.

20 Claims, 7 Drawing Sheets

(56) References Cited

U.S. PATENT DOCUMENTS

| | | | |
|---|---|---|---|
| 7,301,907 | B2 | 11/2007 | Anbarani |
| 7,315,515 | B2 | 1/2008 | Pazos |
| 7,525,923 | B2 | 4/2009 | Matta |
| 7,729,268 | B2 | 6/2010 | Matta et al. |
| 7,768,926 | B2 | 8/2010 | Bellur et al. |
| 7,907,519 | B2 | 3/2011 | Songhurst et al. |
| 7,948,878 | B2 | 5/2011 | Briscoe et al. |
| 8,000,235 | B2 | 8/2011 | Noy et al. |
| 8,144,586 | B2 | 3/2012 | McNaughton et al. |
| 8,223,634 | B2 | 7/2012 | Tanaka et al. |
| 8,934,338 | B2 | 1/2015 | Jacquet et al. |
| 9,270,568 | B2 | 2/2016 | Flinta et al. |
| 9,548,936 | B2 | 1/2017 | Lee et al. |
| 9,906,427 | B2 | 2/2018 | Siemens et al. |
| 9,998,400 | B2 | 6/2018 | Briscoe et al. |
| 11,228,533 | B2 | 1/2022 | Tourrilhes et al. |
| 2007/0115814 | A1 | 5/2007 | Gerla et al. |
| 2008/0259813 | A1 | 10/2008 | Matta et al. |
| 2015/0195205 | A1 | 7/2015 | Flinta et al. |
| 2015/0257162 | A1 | 9/2015 | Reider et al. |
| 2015/0333993 | A1 | 11/2015 | Welin et al. |
| 2017/0324664 | A1 | 11/2017 | Xu et al. |
| 2021/0344581 | A1* | 11/2021 | Tourrilhes ........... H04L 41/0896 |

FOREIGN PATENT DOCUMENTS

| | | |
|---|---|---|
| EP | 2031807 | 3/2009 |
| EP | 2575303 | 4/2013 |

OTHER PUBLICATIONS

Anup et al. "An Enhanced Available Bandwidth Estimation Technique for an End-to-End Network Path." Dec. 2016. (Year: 2016).

Huang et al. "Available Bandwidth Estimation via One-Way Delay Jitter and Queuing Delay Propagation Model." 2006. (Year: 2006).

Lin et al., "A novel hybrid probing technique for end-to-end available bandwidth estimation," IEEE Local Computer Network Conference, Denver, CO, USA, 2010, pp. 400-407.

Ribeiro et al., "PathChirp: Efficient Available Bandwidth Estimation for Network Paths", in Proceedings of 4th passive active measurement workshop, 2003.

Ribeiro, V., et al. "Pathchirp: A light-weight available bandwidth estimation tool for network-aware applications." Proceedings of 2003 LACSI Symposium. New Mexico: LACSI Press, 2003, 12 pages.

Series Y: Global Information Infrastructure, Internet Protocol Aspects, Next-Generation Networks, Internet of Things and Smart Cities, pp. 1-48, Retrieved from the Internet Oct. 21, 2019 from URL: <itu.int/rec/dologin_pub.asp?lang=e&id=T-REC-Y.1543-201806-I!IPDF-E&type=items>.

Strauss et al., "A Measurement Study of Available Bandwidth Estimation Tools," IMC'03, Oct. 27-29, 2003, 6 pages.

Wikipedia, "TCP congestion control," Oct. 23, 2021, <https://en.wikipedia.org/w/index.php?title=TCP_congestion_control&oldid=1051487581>. 15 pages.

* cited by examiner

REVERSE LOSS DETECTION FOR COMMUNICATION NETWORK BANDWIDTH ESTIMATION WITH TOKEN BUCKETS

DESCRIPTION OF RELATED ART

Bandwidth measurement is an essential part of any network traffic engineering solution, including solutions using a Software-defined Wide Area Network (SD-WAN). The framework needs to know how much bandwidth is available on each network path before deciding where to place/route and load balance the network traffic.

In a closed system, it is possible to collect direct measurements on each of the network devices on the paths of the traffic. However, in many cases, it is not possible to collect direct measurements. For example, the network devices may be in a different administrative domain, or may be hidden by tunneling or encapsulation. This is the case for SD-WAN, where the SD-WAN gateway tries to direct traffic to the best path over the Internet.

Better solutions are needed for SD-WAN and other up-and-coming network architecture.

BRIEF DESCRIPTION OF THE DRAWINGS

The present disclosure, in accordance with one or more various examples, is described in detail with reference to the following figures. The figures are provided for purposes of illustration only and merely depict typical examples.

Figure 1:
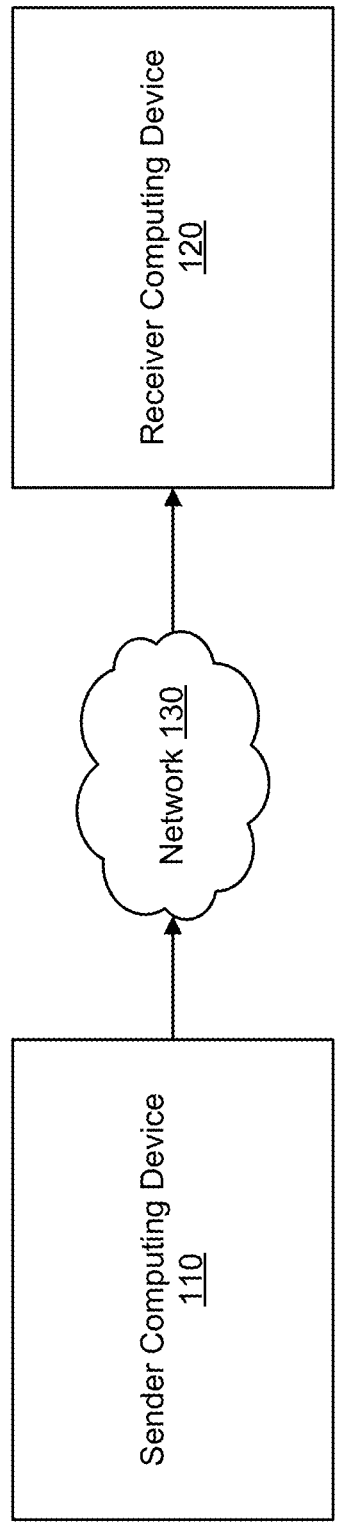
FIG. 1 illustrates a computing environment for implementing various bandwidth estimation processes.

The figures are not exhaustive and do not limit the present disclosure to the precise form disclosed.

DETAILED DESCRIPTION

Bandwidth measurement is difficult in SD-WAN architecture, at least because cross traffic can greatly affect the bandwidth measurement of a wired or wireless communications link (e.g., between edge devices, various users or applications using the same links, etc.). The cross traffic is often dynamic and can fluctuate constantly As such, exact bandwidth measurements in an SD-WAN are nearly impossible to determine.

When direct measurements are not possible, bandwidth estimation can be implemented from two end-points that can be controlled or otherwise used for measurements. For example, the bandwidth estimation can be performed by probing the network path with specially crafted probe packets sent from one end of the path to the other end of the path. The receiver end measures the receive time of the packets and the changes to the packet delay/time pattern to estimate the path characteristics, such as the path capacity, the available bandwidth, or the bulk transfer capacity.

In some examples, a Probe Rate Model (PRM) can be used to estimate the available bandwidth of a network path (e.g., using research projects including PathChirp, Path-Cos++, SLDRT, etc.). The PRM can create a temporary congestion state (e.g., a number of data packets transmitted on the network over a threshold value to slow bandwidth across the network, etc.). Once the temporary congestion state is created on the network path, a controller can measure the increase in queuing delay of probe packets to infer when the path is in a congested state. By determining when the path is in a congested state and when it's not, those methods can then compute an estimate of the available bandwidth.

The PRM can have several limitations. For example, the standard PRM may use packet timing to infer a congested state and may assume that there is no packet losses on the network path. However, the buffers on the network path are not infinite, so if the congested state is significant enough, packet losses can happen. Further, some network devices react to the congested state by exclusively producing packet losses and never increasing queuing delay, which completely defeats the PRM methods and prevents them from measuring available bandwidth. In addition, some network links are unreliable and may drop packets randomly, hindering bandwidth estimation.

Examples of the present disclosure can estimate available bandwidth in view of network congestion. For example, the system may measure available bandwidth available in a black box network. Traditional systems can perform bandwidth estimation using various method discussed herein (e.g., active probing of data packets, passive measurements to measure delays, etc.). The technique described herein can find the point at which packet losses stop and use the probing rate as a bandwidth estimate. Additional actions may be performed, like automatically rerouting packets and/or load balancing network traffic after the probing rate is determined, as described throughout the disclosure.

In some examples, the system may determine a probing rate that is constant or varied. For example, the probe packets may be sent in a chirp train (e.g., a set of probe packets) with a predefined pattern of probing rates. The pattern of probing rates may correspond with a decreasing rate pattern, such that the first few probe packets are sent with a higher probing rate and the probing rate is gradually decreased as packets are sent. Each of these patterns may correspond with the probing rate. A second probing rate may be a different pattern than the probing rate, including a different varied pattern of probing rates.

In some examples, the sender computing device may send a single chirp train corresponding with a set of probe packets. The probe rates in the chirp train may be predetermined. In some examples, the probe rate of a packet is unique within a chirp train, and the chirp train overall may correspond with many different probe rates.

In some examples, a significant packet loss value is computed. The significant packet loss value may correspond with a last point in a chirp train at which two of the packets may be consecutively lost, although other measurements of significant packet loss can be computed, as described throughout the disclosure. The next point after the significant packet loss value is where no two packets are consecutively lost in the set of probe data packets. The significant packet loss value may be computed based on the packets that are lost from a set of probe packets in the chirp train. Once the significant loss value is "below or equal to" a threshold value, the significant loss value may approach zero. The process may select a first packet and a second packet from the chirp train. The first selected packet may be the last received packet for which the significant loss value is greater than zero. The second packet may be the first packet received after the first selected packet. Using the second packet, the process may determine the probing rate of the second packet as the available bandwidth estimate of the network path and use that value to perform an action (e.g., measure available bandwidth in a black box network, reroute traffic, load balance network traffic, etc.).

FIG. 1 illustrates a computing environment for implementing various bandwidth estimation processes. In this illustration, sender computing device 110 transmits one or more data packets to receiver computing device 120 via network 130. Sender computing device 110 and receiver computing device 120 (e.g., clients, servers, etc.) may be endpoints in a communication network that connects the endpoints. Various sender computing devices may send data packets to various receiver computing devices, although a single sender computing device and a single receiver computing device is provided for simplicity of explanation.

An available bandwidth may be measured for sending network communications between sender computing device 110 and receiver computing device 120 may be measured to determine the available bandwidth for this network path. Network bandwidth may correspond with how much of the bandwidth is not used and how much could be added to the network path. The network path may be a wired or wireless communication link to transmit data over network 130 in a given amount of time. The available bandwidth may be reduced by traffic that is already using the network path.

Network traffic engineering is one example of where available bandwidth can be used. The communication path via network 130 between sender computing device 110 and receiver computing device 120 may include multiple possible paths from one endpoint to another. Having multiple paths between endpoints usually improves the resilience to failure and may increase the network bandwidth.

In network traffic engineering, the process may determine the property of network traffic and the network elements and their connectivity to both help design the network and direct traffic onto different paths in that network. In some examples, the primary path between sender computing device 110 and receiver computing device 120 can add a secondary path to be used in case of failure of the primary path.

Network traffic engineering may be composed of three parts. The first part is measurement, where some attributes of the traffic and/or network are measured. The measurement portion of network traffic engineering can incorporate the available bandwidth determination(s) of various network paths, as described herein. The second part is optimization, where and optimal distribution of traffic is computed. The third part is control, where the network is reconfigured to implement the desired distribution of traffic.

Another illustrative network bandwidth estimation process includes Software Defined Networking (SDN). Software Defined Networking (SDN) may manage networks by defining Application Programming Interfaces (APIs). The APIs can allow the system to decouple the datapath (e.g., packet forwarding) and the control plane (e.g., protocol intelligence) of network elements. In other words, a network controller, an entity outside the network element, can have fine-grained control and visibility over that network element. This can be used by the network controller to change the policy of network elements dynamically or to centralize the control plane and decision making of the network.

The SDN approach may be combined with network traffic engineering. For example, SDN APIs usually define both measurement and control, and this can enable the network controller to measure the network and dictate a distribution of traffic through network traffic engineering.

One of the limitations of SDN is that it assumes a tight coupling between the network controller and the network elements. This can work at small to medium scale communication networks, but usually cannot scale to larger networks. The efficiency of the SDN process is diminished if the network between the network controller and network elements has limited performance (e.g., low bandwidth or high latency). Moreover, the SDN approach usually does not allow to cross administrative domain boundaries, because different entities can only trust controlled and limited interactions between each other.

Another example where available bandwidth can be used is Software Defined Wide Area Network (SD-WAN). The SD-WAN process may be implemented in computing environments that are distributed across multiple physical locations, including where sender computing device 110 and receiver computing device 120 are in different physical locations. In consequence, the computing environment may comprise a set of Local Area Networks (LANs) supporting the local physical locations of the entity and a set of Wide Area Network (WAN) links connecting those local networks to each other.

For example, a large bank or retailer may have multiple physical locations and branches. Each location or branch has a set of LANs. In a traditional configuration, all the branches and locations connect to a few central locations using dedicated WAN links (e.g., using routing techniques like Multiprotocol Label Switching (MPLS), etc.) and the few central locations can connect to an external network (e.g., the Internet, etc.) using one or more WAN links. The dedicated WAN links may be provided by a telecommunications company, which generally correspond with high availability and quality of service guarantees, but also have a high monetary cost.

The SD-WAN process proposes to use SDN principles to manage WAN connectivity. This can offer centralized visibility and control over the WAN connectivity of the entity and to reduce the cost of WAN connectivity. SD-WAN can reduce the cost by replacing dedicated WAN links by tunnels over the Internet. In this case, each branch and location has WAN links connected to the Internet, usually using a cheap consumer WAN technology (e.g., digital subscriber line (DSL) modem, cable modem, Wireless 3G, etc.). The network can implement a special SD-WAN gateway in each branch and location to create the private tunnels (e.g., virtual private network (VPN), etc.) to connect securely to other branches and locations over the WAN links and the Internet.

Another example where available bandwidth can be used is Tunnel Handoff. When an SD-WAN gateway detects that a WAN link is down, the gateway can direct traffic away from that WAN link to a tunnel not using that particular WAN link, also called the tunnel handoff. The SD-WAN gateway can create parallel tunnels over network 130 using each WAN link, and then use network traffic engineering to direct traffic to the most appropriate tunnel with the goal of optimally using the available network capacity. In some examples, the SD-WAN gateway can monitor the performance of each tunnel, in terms of latency and throughput, and then load balance traffic or map each traffic type to the most appropriate tunnel for that traffic.

One component of such traffic engineering is a way to measure the performance of each tunnel. Each tunnel defines a network path across the network, the tunneled packets are processed by a number of network elements. The network path used by a tunnel (e.g., outside the tunnel) and the network path within a tunnel are logically different in that they have different addresses. However, in some cases, two network paths can go through the same network elements, have almost the same performance, and their performance characteristics are strongly correlated. Therefore, measuring the performance of an tunnel can be done by measuring the network path outside the tunnel or inside the tunnel.

In some examples, it is difficult to measure the bandwidth estimation for the tunnel handoff process. For example, a direct measurement or a SDN approach cannot be used for those network paths, because the vast majority of the network elements of an Internet path are in different administrative domains (e.g., the various ISPs on the path), and it would be very difficult to get the complete list of all those elements (which in most case is dynamic) and administrative access to them. In some examples, the path measurement can done via end-to-end network path estimation methods and/or by sending probe packets from one end to another, sender computing device 110 to receiver computing device 120.

Various methods may be implemented for determining Bandwidth Estimation and Network Path Estimation. For example, when direct measurement of network elements is not possible (e.g., when they are in a different administrative domains, etc.), the next best process may be end-to-end bandwidth estimation.

End-to-end network path estimation may include active probing of data packets transmitted in network 130. For example, sender computing device 110 at one end of the network path sends special probe packets to receiver computing device 120 at the other end of the network path. Those packets may only be used to estimate bandwidth and may not carry actual data, beyond the data payload required by network path estimation itself.

The estimation process may also include passive measurements, either by measuring delays experienced by existing data transmitted on the network path, or by modulating that data to have specific characteristics. Another variation is a single-ended measurement where the method initiates probe packets by sender computing device 110 that are reflected back to sender computing device 110.

Different methods may estimate different properties of the network path. Bandwidth estimation is a subset of network path estimation. Path capacity is the maximum amount of traffic bandwidth that can be sent if the network path is idle, i.e. without any competing traffic. Available bandwidth (ABW) is the remaining/residual path capacity, i.e. the capacity not currently used by other traffic. Bulk Transfer Capacity (BTC) is the bandwidth a Transmission Control Protocol (TCP) connection would get if placed on this network path. Latency is the one way delay from sender to receiver, and round trip time (RTT) is the two way delay.

With active probing, sender computing device 110 sends a series of specially crafted probe packet patterns to receiver computing device 120. The packet pattern may be defined by the estimation method and may be designed to trigger specific behaviors from the network elements on the network path. For example, in many cases the packet pattern is a probe train, the packets and interval between packets are intended to probe various bandwidths across the packet pattern. Receiver computing device 120 can measure the received time of the packets and compute the one way delay of each packet (i.e. the time taken by a packet to reach from sender device to receiver device). Receiver computing device 120 can examine the changes to the packet pattern. The estimation method uses a simplified network model to convert those measurements into estimates of various network path characteristics.

For bandwidth estimation, two main classes can include a probe gap model (PGM) and a probe rate model (PRM). For PGM, the assumption is that two closely sent packets will see the gap between them increase in proportion to the load on the most loaded queue, due to queuing delay on that queue. For PRM, the assumption is that when packets are sent at a rate lower than the bottleneck bandwidth, the traffic pattern will be mostly unchanged, whereas when packets are sent at a rate greater than the bottleneck bandwidth, those packet will suffer extra queuing delay due to a congested state of the network path.

In practice, PGM and PRM try to infer network path congestion by trying to estimate variations in the queuing delay experienced by the packets at different network elements in the network path. The queuing delay can affect the time it takes for the packet to traverse through the network path. PGM and PRM may compare the one way delay of various probe packets to estimate the variations in the queuing delay. For example, with PGM, two packets may be sent at a known sending interval. The measured receiving interval is assumed to be the sum of the sending interval and the difference in queuing delay between the packets.

Another illustrative network bandwidth estimation process includes Packet One Way Delay (OWD). In PRM, the method can measure the delays of received packets to determine the network path bandwidth. The measurement for each packet uses the OWD process. OWD corresponds with the time difference between when the packet was sent (e.g., sent time) by sender computing device 110 and when it was received (e.g., received time) by receiver computing device 120 via network 130. Some methods compare the OWD of multiple packets.

In some examples, OWD of a packet may correspond with the propagation delay of the network path, the transmission time of the slowest link of the path, and the accumulated queuing delay in all the network elements in the path. For each packet, the formula to determine OWD may comprise:

$$OWD(i) = pd + st(\text{size}) + \text{sum}(qd(e,i))$$

With:
pd→total propagation delay
st(size)→slowest transmission time for this packet size
qd(e,i)→queuing delay at element e for packet i In some examples, PRM may assume a queuing model where qd(e,i) is a function of the congested state at element e when packet i arrives.

OWD has several limitations. For example, sender computing device 110 and receiver computing device 120 may use different clocks to measure packet departure and arrival and these clocks might not be perfectly synchronized. Therefore, it is hard to accurately measure the OWD of packets. Fortunately, in most cases, the absolute OWD of a packets does not matter and only the difference between the OWDs of different packets matters. Over the short time of a probe train, clock drift may be negligible, and the difference between OWDs can be somewhat more accurate. When relative OWD is used, the relative OWD is the measured OWD of that packet, minus the OWD of the first packet.

This relative OWD can estimate the extra queuing delay of a packet (e.g., respective to the first packet) and may be negative.

Another illustrative network bandwidth estimation process includes a PathChirp process, which may use an implementation of PRM. For example, PathChirp can send a periodic probe train from sender computing device 110 to receiver computing device 120. A probe train is a sequence of probe packets sent with specific time interval between probe packet departures. The time intervals between packets define an instantaneous rate, and the network can react to that rate by either leaving that interval mostly unchanged or spacing out the packets. In PathChirp, the probe rate may be increased over the probe train by reducing the time interval between adjacent probe packets.

In some examples, the PathChirp process can measure the relative one way delay of each probe packet in the train, and tries to find the inflexion point where the delay changes from relatively constant to consistently increasing. This change can indicate a congested state in the path. The probe rate associated with the inflexion point may be taken as the main basis for the available bandwidth estimate.

Another illustrative network bandwidth estimation process includes Excursion Detection Algorithm (EDA). EDA may be integrated with PathChirp to help detect the inflexion point (e.g., where the network path becomes fully congested). The same EDA may also find periods of temporary congestion in the part of the probe train before the inflexion point. The idea of the EDA is that an increase in OWD in the probe train can indicate increased congestion in the network path. The EDA uses those OWD increases to detect both temporary congestion and full congestion.

In some examples, the EDA can analyze the relative OWD of packets (e.g., by comparing the OWD of a first packet to the OWD of the previous packet, etc.). If the OWD of a first packet is greater than the OWD of the previous packet, the EDA can identify the first packet as the potential start of an excursion. Moving forward in the probe train, the EDA may try to find a second packet for which OWD is lower enough than the OWD of the first packet at start of the excursion. If such packet is found, it is marked as the end of the potential excursion. Then, the EDA can filter out the potential excursion. If the potential excursion is deemed too small, it may be ignored. If it is big enough, the probe rate associated with the packets in the excursion are used in the computation of the available bandwidth. If no end of excursion is found (e.g., the OWD never decreases past a threshold value), then the start of the final excursion is used as the inflexion point. The probe rate associated with the packet at the inflexion point is the main basis for the computation of the available bandwidth.

Another illustrative network bandwidth estimation process includes a PathCos++ process. PathCos++ can estimate the available bandwidth of a network path using the PRM, i.e. self congestion. For example, PathCos++ sends a periodic probe train. The time interval between two packets may define an instantaneous rate and the network will react to that rate. The probe rate may be decreased over the probe train by increasing the time between probe packets to create a congested state and then relieve gradually this congestion. The PathCos++ process can measure the relative one way delay of each probe packet in the train and try to find a pair of packets which have similar one way delay on both sides of the congestion peak. The similar one way delay may correspond with packets that have similar congestion. The PathCos++ process can try to find the widest spaced packet pair and then compute the average received rate of probe packets between the two packets of the packet pair. The average received rate may be used as the available bandwidth estimate.

Another illustrative network bandwidth estimation process includes Bump Detection Algorithm (BDA). BDA may be integrated with PathCos++ to select a pair of packets with similar congestion on both sides of the congestion peak. The pair of packets selected may be used to estimate the available bandwidth. The quality of the available bandwidth estimate may only be as good as the selection of those packets by the BDA.

In BDA, the probe train has a decreasing rate to first create a congested state of the network path (e.g., rate higher than the bottleneck) and then decongest that network path (e.g., rate lower than the bottleneck). This means that across the probe train, first the OWD of packets goes up (a congested state) and then down (a decongested state). The big bump in OWD may represent the time of maximum congestion, and packets with similar OWD should have experienced similar congestion (e.g., similar amount of queuing).

Another illustrative network bandwidth estimation process includes Transmission Control Protocol (TCP) congestion control. For example, the main use of bandwidth estimation is for traffic engineering and deciding how to place traffic on network paths. Since the vast majority of traffic uses the TCP protocol, traffic engineering basically uses the available bandwidth estimation as a prediction of TCP performance.

TCP performance on a network path is mostly governed by the TCP congestion control. The TCP congestion control tries to determine the optimal rate to send traffic by inferring when it is congesting the path and when it is not. If the path is not in a congested state, the TCP congestion control increases the sending rate from sender computing device 110. If the path is congested, the TCP congestion control decreases the sending rate from sender computing device 110.

Another illustrative network bandwidth estimation process includes packet losses from errors and from congestion. For example, many networks are lossy, which means that packets can get lost or intentionally discarded. Some networks are lossless, meaning they guarantee that no packet get lost. The lossless networks may only work for relatively small networks, as it produces undesirable effects at scale, such as head-of-line blocking. For this reason, most larger networks and network paths are considered lossy.

One reason for packet losses are bit errors in the network devices and transmission errors over noisy links. However, those errors are infrequent. Most link technologies deployed ever noisy channels, such as WiFi and 3G, use link level acknowledgement and retransmissions to conceal the link losses, so actual packet losses due to noise and errors are very rare, unless the conditions are bad. The reason is that TCP assume that packet losses are due to congestion, so the way to obtain optimal performance is by eliminating link level losses.

As a consequence, on a lossy network path, packet losses are almost always caused by congestion and persistent congestion can produce packet losses. If the input rate of traffic is consistently higher than what a link can transmit, the imbalance can be solved by discarding the excess traffic and causing packet drops. As the result, packet losses may be a reliable indicator of network congestion.

Another illustrative network bandwidth estimation process includes Basic queue—Tail drop losses. The link between sender computing device 110 and receiver computing device 120 via network 130 may be a simple queue of fixed capacity before the link. Sender computing device 110 can transmit the packet from the queue over the link as fast as the link is capable and drop packet when the queue is full.

Traffic tends to be bursty, so the queue can accommodate temporary excess in input rate and smooth out processing at the link. As long as the queue is not full, any received packet is either transmitted if the link is idle or added to the queue for being transmitted when the link permits. When the queue is full, any received packet may be discarded. The losses can happen at the tail end of the queue, which is why it's called tail drop losses.

With a perfect queue and constant traffic, the losses may be fine grained and spread smoothly across the chirp train. In practice, losses may be clustered and not uniform across the chirp train. The first cause may be bursty cross traffic that change the load on the queue between the burst the queue has the opportunity to accept more probe packets and less during the burst. The second cause may be granular queue scheduling, where multiple packets are removed from the queue together, after scheduling multiple slots are available in the queue, but after those are filled no slot opens until the next schedule. As the result, packet losses with tail drop are often clustered. In the received traffic at receiver computing device 120, there are sequences with little or no losses alternating with sequence of very high or complete losses. This makes the congestion signal fairly coarse.

A tail drop queue can behave in two main ways. If the cross traffic is not saturating the queue, the queue is mostly empty. In this case, the congestion caused by the chirp train can cause the queue to fill up and the delay to increase, up to when the queue is full at which point the delay stop increasing and packet drop start. If the cross traffic is saturating the queue, the queue is mostly full. In this case, the congestion caused by the chirp train can result is no delay increase (e.g., the queue cannot get more full) and immediate packet losses. The delay may fluctuate based on the burtiness of the cross traffic filling the queue.

Another illustrative network bandwidth estimation process includes Losses from Active Queue Management (AQM). AQM can remedy the defects of tail drop, including its high delay and its coarse congestion signal. AQM can add additional processing at the queue to make loss more proportional to the level of congestion.

AQM may implement Random Early Detection (RED), which defines a probability of drop which is based on the queue occupancy. When the queue is almost empty, the probability is close to 0 and packet drop is very unlikely. When the queue is almost full, this probability is higher and packet drop is more likely. When a packet is received, RED can use the current probability of drop and a random number to determine if the packet is discarded or put in the queue. Packet losses become more probabilistic based queue occupancy.

AQM may implement other probability algorithms than RED (e.g., Blue, ARED, PIE, CoDel, etc.) to maintain a small occupancy of the queue by dropping packets preventively. For example, the CoDel process can try to maintain the queue delay for all packets below a threshold. In another example, the PIE process features a burst protection, where no packet drops occur for the first 150 ms after the queue starts to fill.

In some examples, the short train of packets used by estimation techniques may be too short to trigger a strong AQM response and the losses caused by AQM may be very low on each chirp train. The chirp train may be much more likely to overflow the queue and cause tail drop losses than to see significant AQM losses. As the result, for the purpose of bandwidth estimation, AQM queues can be considered as the same as tail drop queues.

Another illustrative network bandwidth estimation process includes rate limiters, policers, and token buckets. Rate limiters may be used to help conform network traffic to a certain rate. This may be done for policy reasons, for example, as the result of a contractual agreement.

Rate limiters may be implemented with or without a queue. When using a queue, the rate limiter is similar to link of fixed capacity and can be managed via tail dropping or using an AQM. When not using a queue, the implementation of the rate limiter is simplified and can reduce resource usage. They are often called policers or meters to distinguish them from other rate limiters. Those rate limiters can be implemented using a token bucket to accommodate traffic burstiness.

When a token bucket is implemented, the token bucket can hold virtual tokens associated with its maximum capacity and is refilled in tokens at the desired rate. When a packet arrives, if the bucket is not empty, the packet is passed and a token is removed. If the bucket is empty, the packet is discarded. If the link has been underused for a while, the bucket may be full and excess tokens beyond the capacity are discarded. The token bucket capacity (or burst size) can allow an unconstrained rate when the link has been underused.

Rate limiters based on token buckets do not have a queue, and as a result packets may not experience additional delay due to congestion. The congestion signal may correspond with a packet drop. The packet losses can be fairly fine grained if the bucket size is appropriate for the link capacity and traffic burstiness (i.e. not too small and not too large). In practice, configuring the burst size is tricky so most token buckets do not produce smooth patterns of packet losses.

Another illustrative network bandwidth estimation process includes PRM model and packet losses. The PRM model assumes that no probe packets are lost on the network path and that any packet that was sent is received and can be used by the method. None of the existing PRM methods attempt to tolerate packet losses, except for the NEXT-v2 process. The NEXT-v2 process assumes that packet losses are due to random link errors. When a packet is lost, the NEXT-v2 process attempts to reconstruct it by interpolating from neighboring packets. The NEXT-v2 process may tolerate limited packet losses and it may not help with losses due to congestion. Other methods can assume that if there are packet losses in a chirp train, then no estimation can be done. In these cases, the entire chirp train may be discarded and no estimation is done. This can significantly decrease the probability of getting a bandwidth estimate.

PRM methods may not accurately estimate available bandwidth when the bottleneck on a network path is based on a token bucket. For example, the PRM methods measure the OWD increase due to congestion. With a token bucket, there is no queue and the bottleneck may not react to congestion by increasing delay. In this sense, the congested state created by the PRM method does not increase the OWD. In the presence of a token bucket, PRM methods usually fail or give an erroneous estimate. As such, PRM methods currently may not estimate available bandwidth when the bottleneck is a token bucket.

With various other methods for estimating available bandwidth in view of network congestion, examples of the present disclosure improve on these and other methods. The technique described herein can find the point at which packet losses stop and use the probing rate as a bandwidth estimate. Additional actions may be performed, like automatically rerouting packets and/or load balancing network traffic after the probing rate is determined, as described throughout the disclosure.

Figure 2:
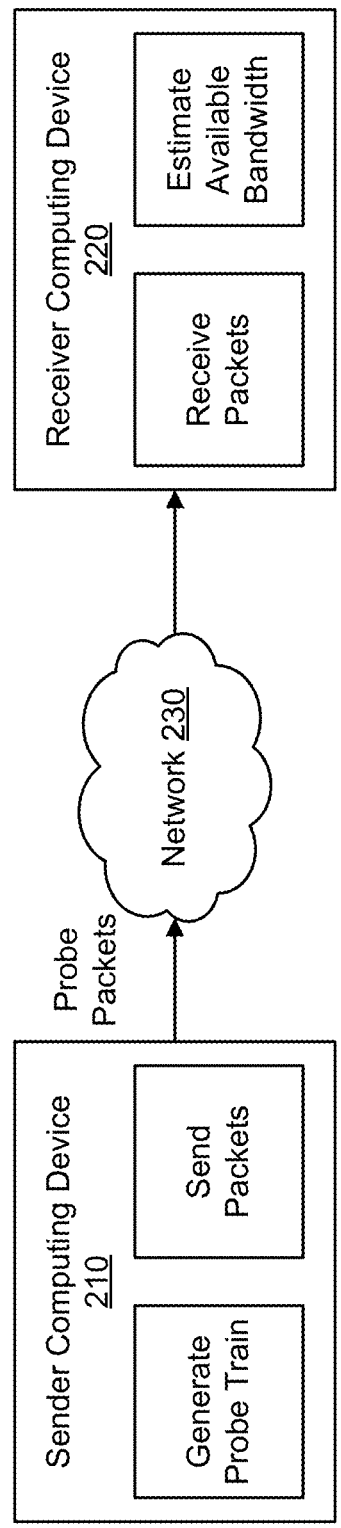
FIG. 2 illustrates a computing environment for implementing a packet loss regression to estimate bandwidth, in accordance with some examples of the disclosure.

FIG. 2 illustrates a computing environment for implementing a packet loss regression to estimate bandwidth, in accordance with some examples of the disclosure. In the illustration, sender computing device 210 transmits one or more data packets to receiver computing device 220 via network 230. Sender computing device 210 and receiver computing device 220 (e.g., clients, servers, etc.) may be endpoints in a communication network that connects the endpoints. Various sender computing devices may send data packets to various receiver computing devices, although a single sender computing device and a single receiver computing device is provided for simplicity of explanation.

Sender computing device 210 may generate a probe train and send the probe packets to receiver computing device 220 via network 230. Receiver computing device 220 may receive the probe packets and estimate the available bandwidth. The process may perform bandwidth estimation in the presence of a bottleneck that reacts to a congested state of the network path by dropping packets and not increasing the delay by implementing a token bucket. The process may find the point at which packet losses stop and use the rate of probes at this point as the bandwidth estimate.

This process of estimating bandwidth using packet loss regression may be beneficial over other processes discussed herein. For example, the packet loss regression process may estimate available bandwidth when the bottleneck only drops packets and does not increase delay. This process may correlate with the Bump Detection Algorithm (BDA) of some other estimation methods and require minimal changes to those methods. Implementing this process in networks may be straightforward for engineers or technicians to implement and may perform with low overhead (e.g., minimize the CPU usage, perform quickly to not slow down network path estimation, etc.).

In some examples, the process may implement a reverse loss detection algorithm for token buckets. Bottlenecks based on token bucket losses may be problematic for bandwidth estimation because they do not increase delay and the BDA cannot be used to compute a bandwidth estimate. Rather, a token bucket is used. The token bucket cannot queue or store packets, so when the token bucket is in a congested state with traffic, it drops the excess packets. The probability of losses depend directly on the difference between the rate of the input traffic and the output rate of the token bucket.

$R\_drop = R\_input - R\_output$ $P\_drop = R\_drop/R\_input = 1 - (R\_ouput/R\_input)$ The traffic in input is a mix of the probe traffic used for estimation and the cross traffic. We assume a constant cross traffic for simplicity. The available bandwidth (ABW) is the difference between the capacity and the cross traffic, therefore:

$R\_input = SR\_probes + SR\_cross$ $ABW = R\_output - SR\_cross$

In most cases, the losses can be evenly spread between the probe and the cross traffic, so the received rate of probes (RR_probes) depends directly to the probability of losses.

$P\_drop = 1 - (R\_output/(SR\_probes + SR\_cross))$ $RR\_probes = (1 - P\_drop) * SR\_probes$ $RR\_probes = (R\_output/(SR\_probes + SR\_cross)) * SR\_probes$ If the rate of probe is greater than the ABW, the receive rate of probes is equal the ABW when the cross traffic is zero. In the presence of cross traffic, the receive rate is higher than the ABW. This is similar to what happen in queues, such rate is called the Asymptotic Data Rate (ADR).

The equations above may hold true when the token bucket is congested (e.g., rate of probe is greater than the ABW). If it's not congested (a decongested state), no packet is dropped and the output rate of each traffic is equal to its input rate.

Figure 3:
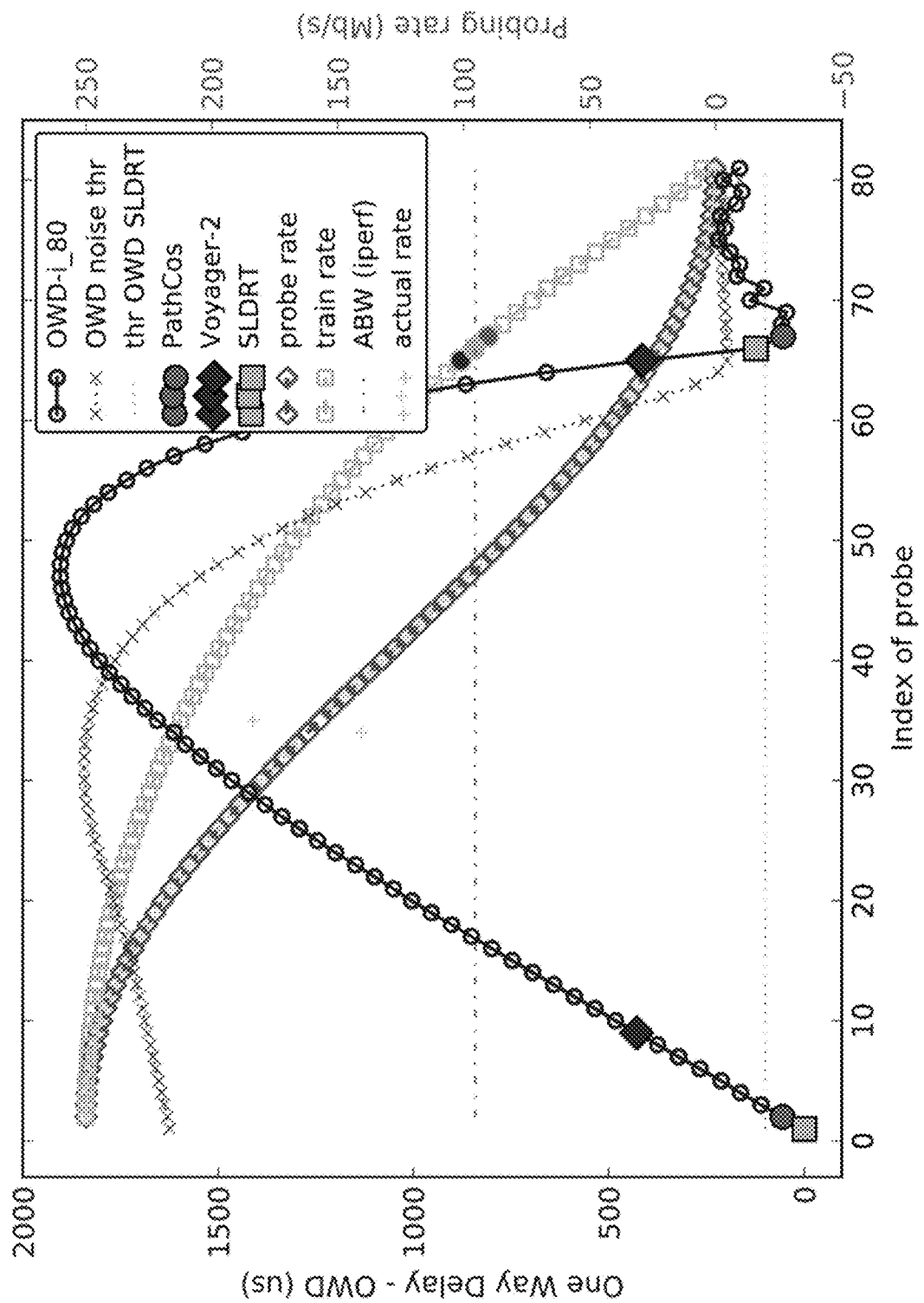
FIG. 3 illustrates types of rate decreasing methods, in accordance with some examples of the application.

The PRM techniques using an EDA determine the ABW by finding the onset of congestion, the point at which the network path transitions from its previously uncongested (e.g., empty, etc.), not congested, or decongested state to its congested state. For example, sender computing device 210 sends probe packets with an increasing rate and the EDA determines the delay increase as a signal of congestion. Illustrations of various types of rate decreasing methods is provided with FIG. 3.

The PRM techniques using the EDA can be adapted for token buckets by determining when the packet losses start. If the probe rate is below the ABW, there should be no losses.

As soon as the probe rate exceeds the ABW, there should be packet losses, so a Loss Detection Algorithm (LDA) may be implemented to find the first occurrence of significant losses in the chirp train and uses the corresponding probe rate as the bandwidth estimate. However, such an LDA does not work in practice. Most token buckets have memory at the onset of congestion (earlier packets impacting later packets). Token buckets have a burst size, when the token bucket has not been congested for a while, a number of tokens accumulates in the bucket. Those accumulated tokens enable traffic to be sent at a much higher rate than the committed rate of the token bucket, until they are exhausted. When the probe rate is below ABW, the tokens are replenished faster than they are consumed, so the bucket remains full. When the probe rate goes over the ABW, the tokens are consumed faster than they are replenished, so the number of token shrinks, however because tokens are available, no packet is dropped yet. After a number of packet of the chirp train sent over the ABW, the bucket is empty, and the token bucket start to drop packets, but at that point the probing rate of the chirp train has already increased past the ABW, leading to overestimation. This effect can be somewhat mitigated by burst detection techniques, but it adds serious inaccuracies to the measurement.

The process may implement LDA procedure in reverse based on a decreasing chirp train to look for the transition to a decongested state. The decreasing chirp train can reduce the rates of probes, so at some point the probe rate at the token bucket goes below the ABW and the losses stop. The Reversed LDA (RLDA) can look at the last occurrence of significant packet losses and use the corresponding probe rate as the bandwidth estimate. This can enable the process to perform bandwidth estimation for token buckets with decreasing chirp trains and eliminate the effect of the burst.

In the RLDA process, the bottleneck may not be a queue and may not have memory during the transition out of a congested state. The token bucket may be incorporated where there is no memory during a decongestive state and where the RLDA can be used to get a bandwidth estimate from the decongestion point. With a token bucket at the decongestion point, the losses may stop and the received rate may become equal to the sending rate (e.g., the probing rate of the packet corresponding to an instantaneous rate at which the packet was sent by the sender).

The RLDA process may find the last point of significant packet losses in the received chirp train. Finding the last point is difficult for several reasons. First, there may be packet losses due to transmission errors. Those packet losses are fairly rare, which is why the RLDA looks for significant packet losses. This means there needs to be a way to distinguish what are significant from non-significant losses, which may add to the estimation error. Second, in most case cross traffic is bursty. This may cause the instantaneous ABW to vary and make the losses more clustered. The packet losses may stop before or after the average ABW due to the cross traffic burstiness. By trying to find a specific point, the process may not perform any averaging across a section of the chirp train. Third, the rate of the chirp train gradually decrease towards the ABW to test various rates, consequently the probability of losses may also gradually decrease to zero. Just before reaching the ABW, the probability of loss is very low. This means that the chirp train does not contain much loss information close to the ABW and the RLDA may determine using a very small amount of packet losses.

The combination of those three constraints can make a simple determination of the point where significant packet loss stop difficult and fairly noisy. This is similar to the shortcoming of techniques based on EDA, the determination of the inflexion point in the chirp train is not robust in presence of noise.

In some examples, the process may find the last point of significant packet losses in the chirp train using clusters of packet losses. If the packet losses are separated by few received packets, they can be considered part of the same cluster of losses. The number of tolerable received packets in a cluster is based on the number of lost packets, which can take into account the burstiness of cross traffic. Isolated packet losses may be ignored and the last loss of the last cluster is used as the last point of significant packet losses. Since the process may use a token bucket (and the token bucket has no memory), every packet loss may be independent of the other and the trend may be consistent across computations and may require fewer computing resources to analyze.

In some examples, the process may implement an extrapolation of the packet loss information trend to find where it reaches zero probability. The first issue is to identify which part of the chirp train to use to estimate that trend (e.g., the token bucket goes through different regimes, having different trends, so a portion of the chirp train is selected to correspond to the congested state). Once the probe rate is below the ABW, the token bucket is no longer in a congested state and has a different trend (constant zero losses), so the corresponding part of the chirp train can be eliminated. This may include eliminating all the packets beyond the last packet with significant loss. The process may also eliminate the part of the chirp train before the detected end of burst (e.g., when the token bucket is in a congested state). If bursting detection is used, it detects the point at which the bursting phase of the token bucket ends and the token bucket starts to be in the congested state. An alternative is to look at the point at which significant losses start, which usually identifies the start of the congested state and eliminate packets before that. A third option is to identify the point at which the probe rate in the chirp train starts to decrease and eliminate packets before that. This third option gives a simpler trend to the data, so is preferred for simpler extrapolations.

The extrapolation may be performed on the set of packets between either the end of burst or the start of rate decrease, and the packet of last significant losses. The extrapolation may help find the probe rate at which packet losses become zero.

In some examples, the extrapolation may implement a linear regression. For example, a line may be fitted through the data and the probe rate may be determined at which the probability of losses reach zero. The probe rate may be used as a bandwidth estimate. The trend may be non-linear and introduce an small error.

In some examples, the extrapolation may implement a non-linear regression (e.g., with curve fitting of the packet drop formula onto the packet loss data, etc.). Similarly, the fitted curve can be used to compute the probe rate at which the probability of losses reach zero. The probe rate may be used as a bandwidth estimate. This method decreases the error but can increase the complexity.

$$P\_drop=1-(R\_output/(SR\_probes+SR\_cross))$$

In some examples, a non-linear regression may be implemented using curve fitting to directly compute the unknown parameter R_output and SR_cross, and from those compute the ABW.

Figure 4:
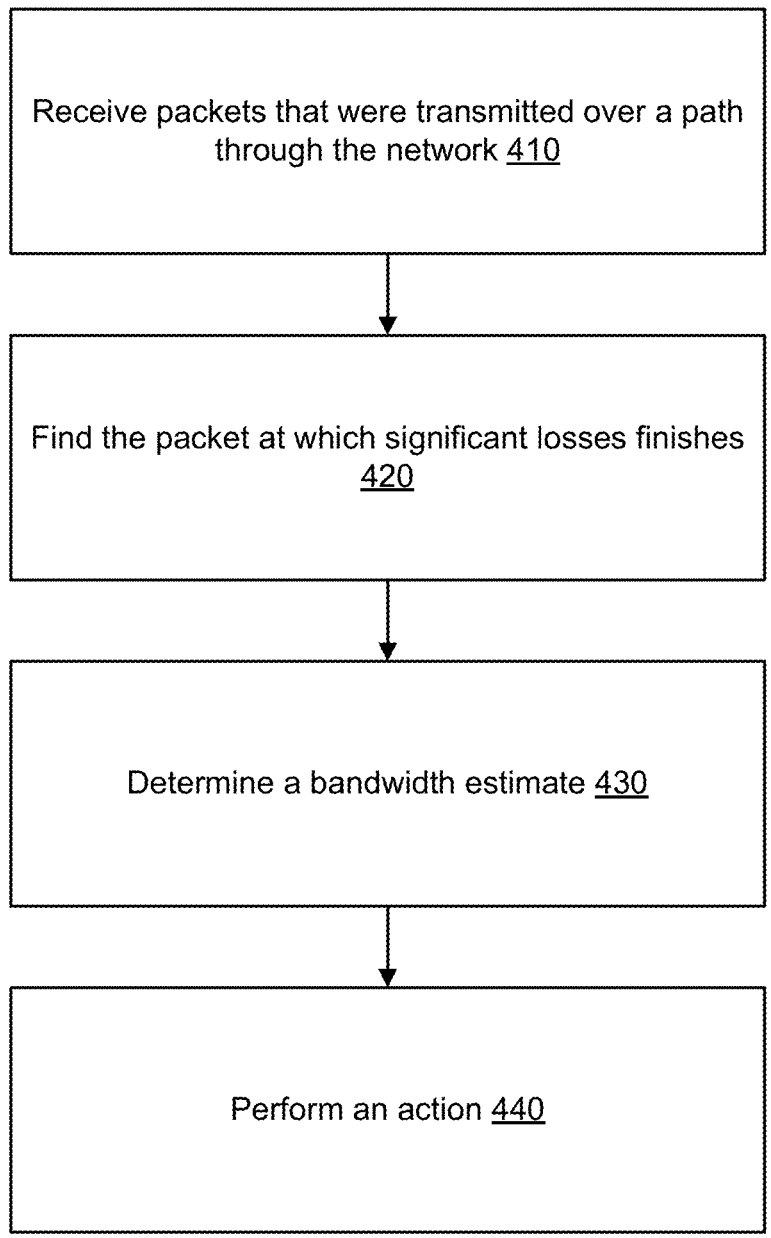
FIG. 4 illustrates a summary of processes for determining a bandwidth estimate, in accordance with some examples of the application.

FIG. 4 illustrates a summary of processes for determining a bandwidth estimate, in accordance with some examples of the application.

At block 410, sender computing device 210 may send packets to receiver computing device 220 via network 230. Receiver computing device 220 may receive packets that were transmitted over a path through the network.

At block 420, receiver computing device 220 may find the packet at which significant losses finishes. For example, the number of packet losses may be less than a threshold value. The time at which the losses finish and/or the number of packet losses may be determined.

In some examples, a number of consecutive losses may be used as the significant losses value.

In some examples, the losses may be considered significant for various reasons. For example, they may be significant if they are part of a cluster of packet losses and/or separated from other losses by few received packets.

At block 430, receiver computing device 220 may determine a bandwidth estimate. For example, the bandwidth estimate may be based on a probe rate associated with that packet and/or actual received rate of a subset of the chirp train. The lower of these two values may be used as the bandwidth estimate.

In some examples, the probe rate of the packet may be used as the overall probe rate and/or the bandwidth estimate.

In some examples, when using a linear regression on the packet loss data before the packet determined in block 420 to compute the probe rate at which losses reach zero, use that computed probe rate as a bandwidth estimate.

In some examples, when using a non-linear curve fitting of packet loss data before the packet determined in block 420 to compute the probe rate at which losses reach zero, use that computed probe rate as a bandwidth estimate.

In some examples, when using a non-linear curve fitting of packet loss data before the packet determined in block 420 to determine the output rate of the token bucket and the amount of cross traffic, and use those to compute a probe rate, use that probe rate as a bandwidth estimate.

At block 440, one or more actions may be performed in response to determining the bandwidth estimate.

In some examples, the action may comprise generating a reporting notification that comprises the available bandwidth estimate. The reporting notification may be transmitted to a traffic engineering module of receiver computing device 220, a human user, or an external computing system configured to report or receive notifications.

In some examples, the action may comprise automatically rerouting packets to reduce the amount of packet loss on a particular network path. For example, a new probe packet may be transmitted to a controller node to help reroute the packets in a black box network.

In some examples, the action may comprise initiating a load balancing of network traffic after the probing rate is determined. For example, sender computing device 210 may transmit a request to a controller node to help initiate the load balance in a black box network.

In some examples, the action may comprise turning on or off some network path routes, links, or access to network devices. In some examples, the action may comprise creating or stopping some network tunnels.

In some examples, the action may comprise reconfiguring some links or network devices. This may include relocating devices or other resources.

In some examples, the action may comprise starting or stopping some network applications. This may include starting or stopping a backup process on a particular network device or restarting the device altogether.

There are various benefits discussed throughout this disclosure. For example, when using the Reverse Loss Detection Algorithm (RLDA), the process can perform bandwidth estimation in the presence of token buckets or network bottleneck that only drop packets. Previously, bandwidth estimation was either not done or would have huge estimation error.

Additionally, there may be better available bandwidth estimates using this process. This may improve the efficiency of traffic engineering for most networks, including in the context of SD-WAN.

Additionally, the process may be combined with other techniques to perform available bandwidth estimation. In some examples, the same chirp train can be used by both RLDA and a method using BDA. This means the same chirp train can be used when the bottleneck is a queue or a token bucket. This may be particularly useful when cross traffic varies and the bottleneck of a network path alternate between a queue and a token bucket. In some examples, the system can be retrofitted without having to restructure the code or change packet formats.

Figure 5:
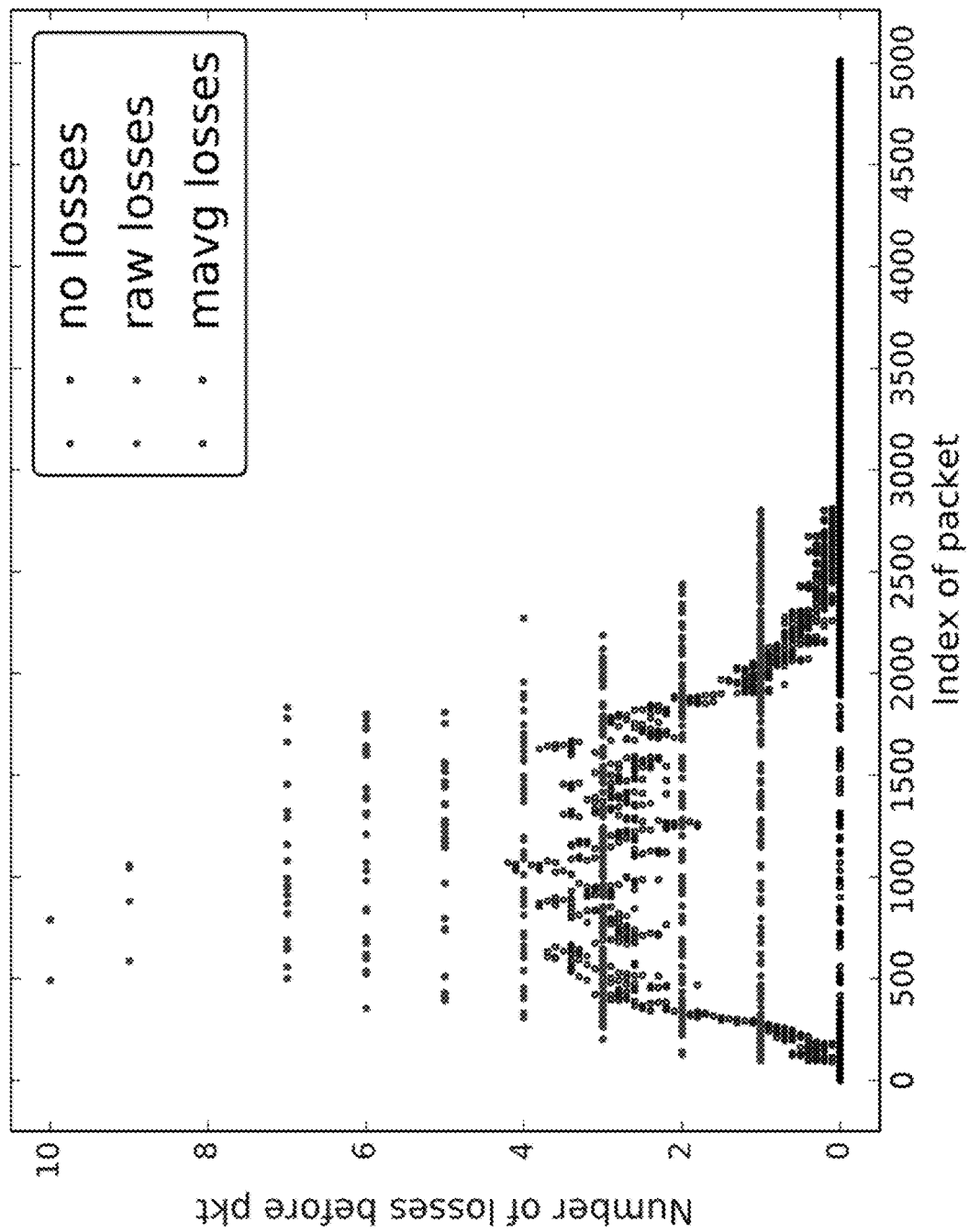
FIG. 5 illustrates packet losses associated with reverse loss detection, in association with some examples of the application.

FIG. 5 illustrates packet losses associated with reverse loss detection, in association with some examples of the application.

For example, using RLDA, the process may find point of last significant losses which may be similar to EDA or PathChirp, but in reverse and looking for losses rather than received packets.

In another example, using the point of last significant loss, the process may look at the last point of loss cluster. The cluster may comprise losses separated few received packets. In some examples, the cluster may be calculated using num_rcv<2*num_losses.

In another example, using interpolation, the process may use linear regression as the loss rate. When non-linear regression is used, the curve may correspond with the loss probability onto the data. The calculation may correspond with:

$$P=1-(R\_out/(SR\_probe+SR\_cross))$$

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 6:
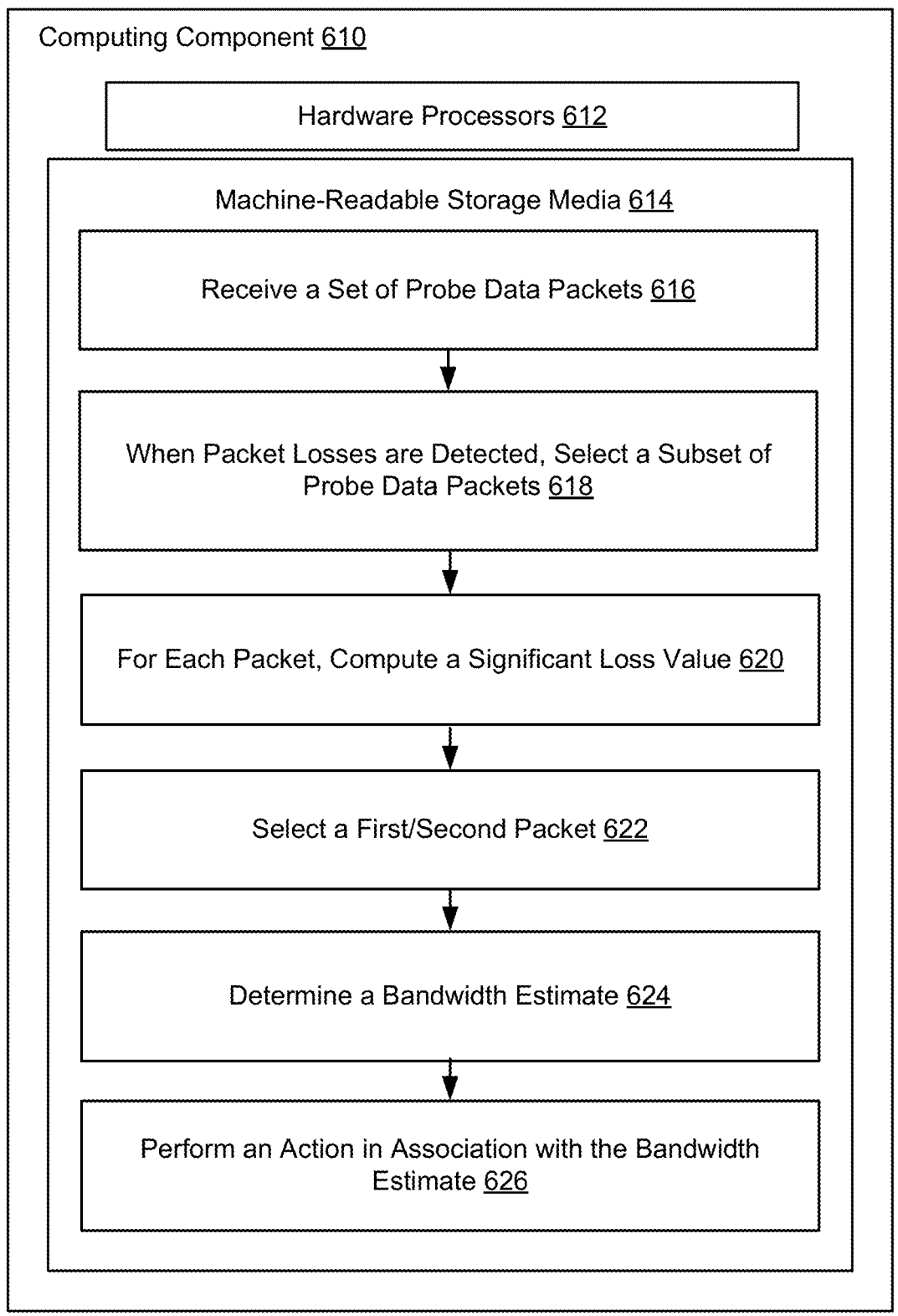
FIG. 6 is an example computing component that may be used to implement various features of examples described in the present disclosure.

FIG. 6 illustrates an example computing component that may be used to implement reverse loss detection for communication network bandwidth estimation with token buckets in accordance with various examples. Referring now to FIG. 6, computing component 610 may be, for example, a server computer, a controller, or any other similar computing component capable of processing data. In the example implementation of FIG. 6, the computing component 610 includes a hardware processor 612, and machine-readable storage medium for 614.

Hardware processor 612 may be one or more central processing units (CPUs), semiconductor-based microprocessors, and/or other hardware devices suitable for retrieval and execution of instructions stored in machine-readable storage medium 614. Hardware processor 612 may fetch, decode, and execute instructions, such as instructions 616-626, to control processes or operations for burst preloading for available bandwidth estimation. As an alternative or in addition to retrieving and executing instructions, hardware processor 612 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 614, may be any electronic, magnetic, optical, or other physical storage device that contains or stores executable instructions. Thus, machine-readable storage medium 614 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 614 may be a non-transitory storage medium, where the term "non-transitory" does not encompass transitory propagating signals. As described in detail below, machine-readable storage medium 614 may be encoded with executable instructions, for example, instructions 616-626.

Hardware processor 612 may execute instruction 616 to receive a set of probe data packets. For example, hardware processor 612 may receive, from a sender computing device, a set of probe data packets that are transmitted over a network path through a communication network.

Hardware processor 612 may execute instruction 618 to select a subset of probe data packets. For example, hardware processor 612 may, when packet losses are detected in the set of probe data packets, select a subset of the set of probe data packets.

Hardware processor 612 may execute instruction 620 to compute a significant loss value. For example, hardware processor 612 may, for each packet of the subset of the set of probe data packets, compute a significant loss value for the packet based on the packet losses. In some examples, the packet losses are detected from the set of probe packets.

Hardware processor 612 may execute instruction 622 to select first or second packet. For example, hardware processor 612 may select a first packet in the subset of the set of probe data packets. The first selected packet may correspond with the last received packet in the subset for which the significant loss value is greater than zero.

In some examples, hardware processor 612 may select a second packet in the subset of the set of probe data packets. The second packet may correspond with a next packet received after the first selected packet.

Hardware processor 612 may execute instruction 624 to determine a bandwidth estimate. For example, hardware processor 612 may determine a bandwidth estimate for the network path based on a probing rate of the second packet corresponding to an instantaneous rate at which the second packet was sent by the sender computing device.

Hardware processor 612 may execute instruction 626 to perform an action in association with the bandwidth estimate. For example, hardware processor 612 may perform an action in association with the bandwidth estimate for the network path in the communication network.

In some examples, hardware processor 612 may compute the significant loss value for a packet as a number of packets lost between the packet and a previously received packet.

In some examples, hardware processor 612 may compute the significant loss value for a packet as a number of packets lost between the packet and a previously received packet minus a fixed offset.

In some examples, hardware processor 612 may use a clustering algorithm to create one or more clusters of packet losses. The clusters of packet losses may be statistically related. For a packet of the subset of the set of probe data packets, when more than one of the packet losses between the packet and a previously received packet are part of a cluster with a size greater than a threshold value, setting the significant loss value of this packet as one, otherwise, setting the significant loss value of the packet as zero.

In some examples, hardware processor 612 may compute the significant loss value for a packet as a value given by a linear regression of a number of packet losses between consecutively received packets in the subset of the set of probe data packets.

In some examples, hardware processor 612 may compute the significant loss value for a packet as a value given by a non-linear curve fitting of a number of packet losses between consecutively received packets in the subset of the set of probe data packets.

In some examples, the subset of the set of probe data packets is the part of a chirp train where losses are present.

In some examples, a subset of a chirp train has a decreasing rate.

Figure 7:
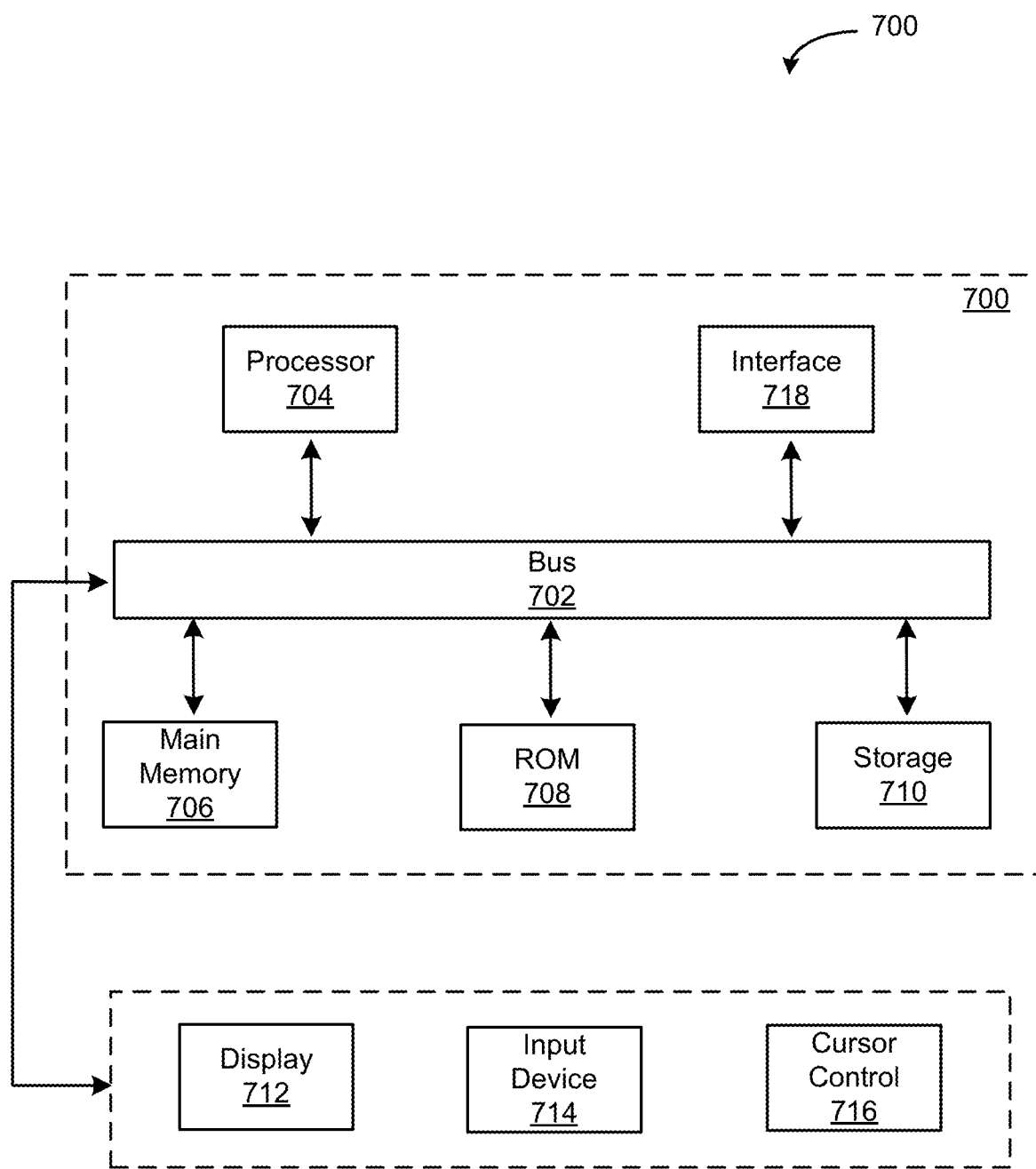
FIG. 7 depicts a block diagram of an example computer system in which various of the examples described herein may be implemented.

FIG. 7 depicts a block diagram of an example computer system 700 in which various of the examples described herein may be implemented. For example, sender computing device 210 or receiver computing device 220 illustrated in FIG. 2 may be implemented as example computer system 700 in FIG. 7. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some examples, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one example, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 718, which carry the digital data to and from computer system 700, are example forms of transmission media.

The computer system 700 can send messages and receive data, including program code, through the network(s), network link and network interface 718. In the Internet example, a server might transmit a requested code for an application program through the Internet, the ISP, the local network and network interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A receiver computing device comprising:
a memory; and
one or more processors that are configured to execute machine readable instructions stored in the memory for performing the method comprising:
receiving, from a sender computing device, a set of probe data packets that are transmitted over a network path through a communication network;
when packet losses are detected in the set of probe data packets, selecting a subset of the set of probe data packets;
for each packet of the subset of the set of probe data packets, computing a significant loss value for the packet based on the packet losses detected from the set of probe packets;
selecting a first packet in the subset of the set of probe data packets, wherein the first selected packet corresponds with the last received packet in the subset for which the significant loss value is greater than zero;
selecting a second packet in the subset of the set of probe data packets, wherein the second packet corresponds with a next packet received after the first selected packet;
determining a bandwidth estimate for the network path based on a probing rate of the second packet corresponding to an instantaneous rate at which the second packet was sent by the sender computing device; and
performing an action in association with the bandwidth estimate for the network path in the communication network.

2. The receiver computing device of claim 1, wherein the machine readable instructions further perform the method comprising:
computing the significant loss value for a packet as a number of packets lost between the packet and a previously received packet.

3. The receiver computing device of claim 1, wherein the machine readable instructions further perform the method comprising:
computing the significant loss value for a packet as a number of packets lost between the packet and a previously received packet minus a fixed offset.

4. The receiver computing device of claim 1, wherein the machine readable instructions further perform the method comprising:
using a clustering algorithm to create one or more clusters of packet losses, wherein the clusters of packet losses are statistically related;
for a packet of the subset of the set of probe data packets:
when more than one of the packet losses between the packet and a previously received packet are part of a cluster with a size greater than a threshold value, setting the significant loss value of this packet as one, otherwise, setting the significant loss value of the packet as zero.

5. The receiver computing device of claim 1, wherein the machine readable instructions further perform the method comprising:
computing the significant loss value for a packet as a value given by a linear regression of a number of packet losses between consecutively received packets in the subset of the set of probe data packets.

6. The receiver computing device of claim 1, wherein the machine readable instructions further perform the method comprising:
computing the significant loss value for a packet as a value given by a non-linear curve fitting of a number of packet losses between consecutively received packets in the subset of the set of probe data packets.

7. The receiver computing device of claim 1, wherein the subset of the set of probe data packets is the part of a chirp train where losses are present.

8. The receiver computing device of claim 1, wherein a subset of a chirp train has a decreasing rate.

9. A computer-implemented method for determining a bandwidth estimate for a network path in a communication network, the method comprising:
receiving, from a sender computing device, a set of probe data packets that are transmitted over the network path through the communication network;
when packet losses are detected in the set of probe data packets, selecting a subset of the set of probe data packets;
for each packet of the subset of the set of probe data packets, computing a significant loss value for the packet based on the packet losses detected from the set of probe packets;
selecting a first packet in the subset of the set of probe data packets, wherein the first selected packet corresponds with the last received packet in the subset for which the significant loss value is greater than zero;
selecting a second packet in the subset of the set of probe data packets, wherein the second packet corresponds with a next packet received after the first selected packet;
determining a bandwidth estimate for the network path based on a probing rate of the second packet corresponding to an instantaneous rate at which the second packet was sent by the sender computing device; and
performing an action in association with the bandwidth estimate for the network path in the communication network.

10. The method of claim 9, further comprising:
computing the significant loss value for a packet as a number of packets lost between the packet and a previously received packet.

11. The method of claim 9, further comprising:
computing the significant loss value for a packet as a number of packets lost between the packet and a previously received packet minus a fixed offset.

12. The method of claim 9, further comprising:
using a clustering algorithm to create one or more clusters of packet losses, wherein the clusters of packet losses are statistically related;
for a packet of the subset of the set of probe data packets:
when more than one of the packet losses between the packet and a previously received packet are part of a cluster with a size greater than a threshold value, setting the significant loss value of this packet as one, otherwise, setting the significant loss value of the packet as zero.

13. The method of claim 9, further comprising:
computing the significant loss value for a packet as a value given by a linear regression of a number of packet losses between consecutively received packets in the subset of the set of probe data packets.

14. The method of claim 9, further comprising:
computing the significant loss value for a packet as a value given by a non-linear curve fitting of a number of packet losses between consecutively received packets in the subset of the set of probe data packets.

15. The method of claim 9, wherein the subset of the set of probe data packets is the part of a chirp train where losses are present.

16. The method of claim 9, wherein a subset of a chirp train has a decreasing rate.

17. A non-transitory computer-readable storage medium storing a plurality of instructions executable by one or more processors, the plurality of instructions when executed by the one or more processors cause the one or more processors to:
receive, from a sender computing device, a set of probe data packets that are transmitted over the network path through the communication network;
when packet losses are detected in the set of probe data packets, select a subset of the set of probe data packets;
for each packet of the subset of the set of probe data packets, compute a significant loss value for the packet based on the packet losses detected from the set of probe packets;
select a first packet in the subset of the set of probe data packets, wherein the first selected packet corresponds with the last received packet in the subset for which the significant loss value is greater than zero;
select a second packet in the subset of the set of probe data packets, wherein the second packet corresponds with a next packet received after the first selected packet;
determine a bandwidth estimate for the network path based on a probing rate of the second packet corresponding to an instantaneous rate at which the second packet was sent by the sender computing device; and
perform an action in association with the bandwidth estimate for the network path in the communication network.

18. The computer-readable storage medium of claim 17, further to:
compute the significant loss value for a packet as a number of packets lost between the packet and a previously received packet.

19. The method of claim 17, further to:
compute the significant loss value for a packet as a number of packets lost between the packet and a previously received packet minus a fixed offset.

20. The method of claim 17, further to:
use a clustering algorithm to create one or more clusters of packet losses, wherein the clusters of packet losses are statistically related;
for a packet of the subset of the set of probe data packets:
when more than one of the packet losses between the packet and a previously received packet are part of a cluster with a size greater than a threshold value, set the significant loss value of this packet as one,
otherwise, set the significant loss value of the packet as zero.

* * * * *